(12) United States Patent
Kelly et al.

(10) Patent No.: US 12,337,796 B1
(45) Date of Patent: Jun. 24, 2025

(54) VEHICULAR LADDER SYSTEM AND METHODS OF MAKING AND USING SAME

(71) Applicant: Kelly Industries, LLC, Draper, UT (US)

(72) Inventors: James E. Kelly, Draper, UT (US); Michael J. Spens, Draper, UT (US)

(73) Assignee: Kelly Industries, LLC, Draper, UT (US)

( * ) Notice: Subject to any disclaimer, the term of this patent is extended or adjusted under 35 U.S.C. 154(b) by 837 days.

(21) Appl. No.: 17/573,342

(22) Filed: Jan. 11, 2022

Related U.S. Application Data

(60) Provisional application No. 63/136,164, filed on Jan. 11, 2021.

(51) Int. Cl.
| | |
|---|---|
| *E06C 5/04* | (2006.01) |
| *B60R 3/02* | (2006.01) |
| *B60R 3/00* | (2006.01) |
| *E06C 1/383* | (2006.01) |
| *E06C 9/06* | (2006.01) |
| *E06C 9/14* | (2006.01) |

(52) U.S. Cl.
CPC .............. B60R 3/02 (2013.01); E06C 5/04 (2013.01); *B60R 3/007* (2013.01); *E06C 1/3835* (2013.01); *E06C 9/06* (2013.01); *E06C 9/14* (2013.01)

(58) Field of Classification Search
None
See application file for complete search history.

(56) References Cited

U.S. PATENT DOCUMENTS

| | | | |
|---|---|---|---|
| 2,819,005 A | 1/1958 | Roberts | |
| 2,840,290 A | 6/1958 | Roberts | |
| 2,946,397 A | 7/1960 | Berberich | |
| 3,672,549 A * | 6/1972 | Chorey | B60R 3/005 224/310 |
| 4,240,571 A | 12/1980 | Ernst | |
| 4,264,084 A * | 4/1981 | Telles | B60R 3/02 182/115 |

(Continued)

FOREIGN PATENT DOCUMENTS

| | | | |
|---|---|---|---|
| EP | 1388638 A1 * | 2/2004 | ........... E06C 1/3835 |
| JP | H08158768 A | 6/1996 | |

(Continued)

OTHER PUBLICATIONS

International Search Report and Written Opinion, dated Feb. 3, 2017, 9 pages, issued in International Application No. PCT/US2016/063603.

*Primary Examiner* — Phi D A
(74) *Attorney, Agent, or Firm* — AVEK IP, LLC

(57) ABSTRACT

A ladder system for a vehicle. The ladder system comprises a mounting bar having a channel extending along a length of the mounting bar. The ladder system includes a pair of securing members securing the mounting bar to a roof rack. The ladder system includes a ladder comprising a first side rail, a second side rail, a first slidable member configured to slide within the first side rail, a second slidable member configured to slide within the second side rail, a coupler secured to the first side rail and pivotably coupling the first side rail to the channel, and a hook coupled to the second side rail and hooking the second side rail to the mounting bar when the ladder is in a use configuration.

20 Claims, 16 Drawing Sheets

(56) References Cited

U.S. PATENT DOCUMENTS

| | | | |
|---|---|---|---|
| 4,390,117 | A | 6/1983 | Fagan |
| 4,618,083 | A | 10/1986 | Weger, Jr. |
| 4,720,116 | A * | 1/1988 | Williams .................. B60R 3/02 182/127 |
| 4,750,587 | A * | 6/1988 | McAllister ............ E06C 1/3835 182/206 |
| 4,757,876 | A * | 7/1988 | Peacock .................... E06C 1/52 182/95 |
| 4,846,303 | A * | 7/1989 | Cooper ................... B63B 27/14 182/36 |
| 5,205,603 | A * | 4/1993 | Burdette, Jr. ............. B60R 3/02 182/195 |
| 5,465,929 | A | 11/1995 | Dooley |
| 6,012,545 | A * | 1/2000 | Faleide ................... E06C 9/085 182/127 |
| 6,315,078 | B1 * | 11/2001 | Kumher .................... E06C 9/12 182/39 |
| 6,357,643 | B1 | 3/2002 | Janner et al. |
| 6,378,654 | B1 | 4/2002 | Ziaylek et al. |
| 6,761,296 | B2 | 7/2004 | Ford et al. |
| 7,527,324 | B1 | 5/2009 | Clonan |
| 8,215,453 | B2 | 7/2012 | Mickens |
| 8,708,102 | B2 | 4/2014 | Mickens |
| 9,725,042 | B1 * | 8/2017 | Hanser ...................... B60R 3/02 |
| 9,914,396 | B1 * | 3/2018 | Scott ......................... B60R 3/02 |
| 2004/0069566 | A1 | 4/2004 | Bareket |
| 2006/0017303 | A1 | 1/2006 | Weege et al. |
| 2007/0090139 | A1 | 4/2007 | McKenzie |
| 2007/0240936 | A1 | 10/2007 | Brookshire et al. |
| 2008/0106111 | A1 * | 5/2008 | Pritchard .................. B60R 3/02 296/62 |
| 2008/0185111 | A1 | 8/2008 | Zagone |
| 2008/0210916 | A1 | 9/2008 | Berkbuegler |
| 2010/0089698 | A1 | 4/2010 | Brodsack |
| 2017/0144602 | A1 | 5/2017 | Kelly et al. |
| 2017/0144605 | A1 * | 5/2017 | Kelly ........................ E06C 5/04 |
| 2019/0126832 | A1 * | 5/2019 | Knichel .................... B60R 3/02 |
| 2021/0339681 | A1 * | 11/2021 | McNea .................... B60R 3/02 |
| 2021/0402930 | A1 * | 12/2021 | Stinner .................... B60R 3/02 |
| 2022/0289112 | A1 * | 9/2022 | Parack ...................... E06C 5/04 |
| 2023/0021767 | A1 * | 1/2023 | Watson .................... B60R 3/02 |
| 2023/0100518 | A1 * | 3/2023 | Denz ........................ B60R 3/02 182/97 |
| 2023/0382306 | A1 * | 11/2023 | Brick ........................ B60R 3/02 |
| 2023/0415654 | A1 * | 12/2023 | Lade ........................ B60R 3/02 |
| 2024/0343198 | A1 * | 10/2024 | Tripp ....................... E06C 9/08 |

FOREIGN PATENT DOCUMENTS

| | | | |
|---|---|---|---|
| WO | WO-2014023566 A1 * | 2/2014 | .............. B60R 3/02 |
| WO | 2017091728 A1 | 6/2017 | |

* cited by examiner

VEHICULAR LADDER SYSTEM AND METHODS OF MAKING AND USING SAME

CROSS REFERENCE TO RELATED APPLICATIONS

The application claims priority to U.S. Provisional Patent Application, Ser. No. 63/136,164 filed Jan. 11, 2021, the disclosure of which is incorporated by reference herein in its entirety.

FIELD OF THE DISCLOSURE

The disclosure relates generally to the field of roof rack accessories. More specifically, the disclosure relates to a ladder system configured to be coupled to a roof rack of a vehicle.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

In an embodiment, a ladder system for a vehicle is provided. The vehicle has a roof rack system including a front roof rack and a rear roof rack. The front roof rack has a front vertical member and the rear roof rack has a rear vertical member. The ladder system comprises a mounting bar having a channel extending along a length of the mounting bar. The ladder system includes a pair of clamps configured to mount the mounting bar to the front vertical member and the rear vertical member such that the mounting bar extends along a length of the vehicle. The ladder system includes a ladder comprising a first side rail, a second side rail, a first slidable member configured to slide within the first side rail, a second slidable member configured to slide within the second side rail, a coupler secured to the first side rail and configured to slidably and pivotably couple the first side rail to the channel, and a hook coupled to the second side rail and configured to hook the second side rail to the mounting bar when the ladder is in a use configuration. The ladder is selectively retractable in a lengthwise direction and selectively collapsible in a widthwise direction. The first slidable member and the second slidable member are collectively pivotable relative to the first side rail and the second side rail. In a stowed configuration, the ladder extends parallel to the mounting bar.

In another embodiment, a ladder system for a vehicle is disclosed. The vehicle has a roof rack system including a front roof rack and a rear roof rack. The front roof rack has a front vertical member and the rear roof rack has a rear vertical member. The ladder system includes a mounting bar having a channel extending along a length of the mounting bar. The ladder system has a pair of securing members configured to secure the mounting bar to the front vertical member and the rear vertical member such that the mounting bar extends along a length of the vehicle. The ladder system includes a ladder comprising a first side rail, a second side rail, a first slidable member configured to slide within the first side rail, a second slidable member configured to slide within the second side rail, a coupler secured to the first side rail and slidably and pivotably coupling the first side rail to the channel, and a hook coupled to the second side rail and configured to hook the second side rail to the mounting bar when the ladder is in a use configuration. The ladder is selectively retractable in a lengthwise direction and selectively collapsible in a widthwise direction. In a stowed configuration, the ladder extends parallel to the mounting bar.

In yet another embodiment, a ladder system for a vehicle is provided. The vehicle has a roof rack system including a front roof rack and a rear roof rack. The front roof rack has a front vertical member and the rear roof rack has a rear vertical member. The ladder system comprises a mounting bar having a channel extending along a length of the mounting bar. The ladder system includes a pair of securing members securing the mounting bar to the front vertical member and the rear vertical member such that the mounting bar extends along a length of the vehicle. The ladder system includes a ladder comprising a first side rail, a second side rail, a first slidable member configured to slide within the first side rail, a second slidable member configured to slide within the second side rail, a coupler secured to the first side rail and pivotably coupling the first side rail to the channel, and a hook coupled to the second side rail and hooking the second side rail to the mounting bar when the ladder is in a use configuration.

BRIEF DESCRIPTION OF THE SEVERAL VIEWS OF THE DRAWINGS

Illustrative embodiments of the present disclosure are described in detail below with reference to the attached drawing figures and wherein.

DETAILED DESCRIPTION

Vehicles are used to transport cargo every day. Vehicles transport everything from sporting equipment to groceries to vacation items. To aid in the transport of items, vehicle users may opt to purchase roof racks with the vehicle and/or have an aftermarket roof rack system installed on the vehicle. The roof rack system may enable the transport of a plethora of items, such as bicycles, snow equipment, water equipment, et cetera. A vehicle may have a transportation cargo pod installed as part of the roof rack system. The transportation cargo pod may provide additional storage space to the vehicle user.

The roof rack system may not always be easy to access. Specifically, a height differential between the user and the vehicle may make access to the roof rack and the contents thereof difficult. A user may have to climb onto/into the vehicle to reach the roof. This may result in the user opening a passenger or driver door and stepping on the seat of the vehicle and potentially damaging the seat or the side of the vehicle. If the weather is cold or hot, leaving the door open to climb on the seats may allow exterior air to enter a vehicle, thereby causing discomfort to passengers.

Alternatively, a step stool or ladder may be used but the step stool or ladder may require transportation. The step stool or ladder may be unduly large and it may be difficult to transport the step stool or ladder using the vehicle. Further, the ground on which an unsecured step ladder might rest could be fouled with snow, ice, mud, rocks, etc., making security of the ladder uncertain.

It may be beneficial for the vehicle user to have associated with the vehicle a ladder that allows the user to safely access the roof rack. It may further be beneficial for this ladder to be storable on an outer surface of the vehicle, so as to not take up valuable space inside the vehicle. It may likewise be beneficial for this ladder to have a selectively minimizable form factor so that stowage of the ladder at the exterior of the vehicle is convenient and aerodynamically inconsequential. The present disclosure may provide for a ladder system that meets one or more of these objectives.

Figure 1:
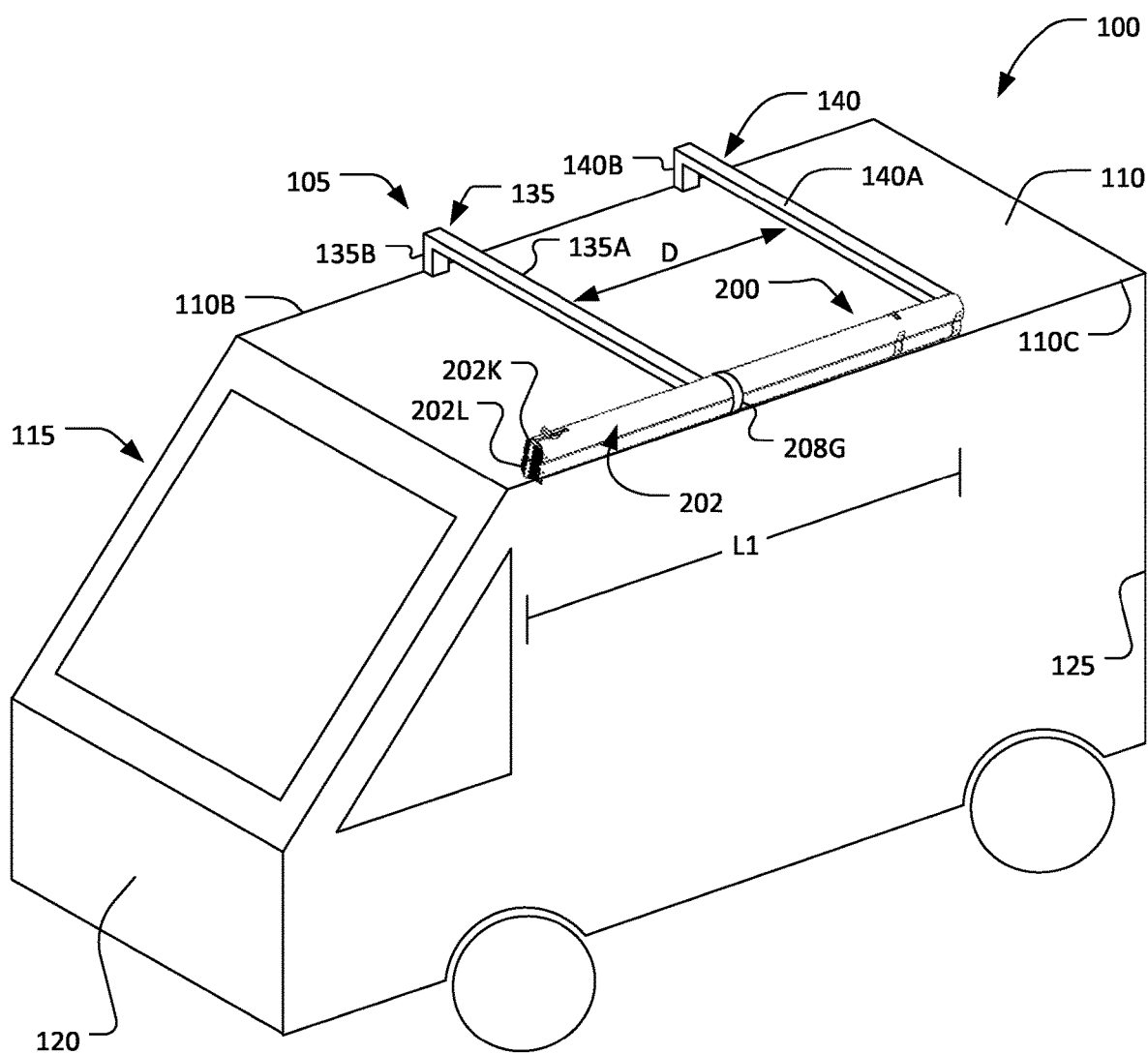
FIG. 1 is an isometric view of a vehicular ladder system with its ladder in a stowed configuration, according to an embodiment of the present disclosure.

Focus is directed to FIG. 1, which shows a vehicle 100 with a roof rack system 105 installed on or proximate the roof 110 of the vehicle 100. The vehicle 100 may be any vehicle such as a standard utility vehicle (SUV), crossover, truck, minivan, coupe, sedan, wagon, hatchback, or the like. The vehicle 100 shown in FIG. 1 is merely representative of a generic vehicle and is not meant to limit the disclosure herein.

The vehicle 100 may include a body 115 having a forward end 120 and a rear end 125 opposite the forward end 120. The roof rack system 105 associated with the roof 110 may be an OEM roof rack or an after-market roof rack. The roof rack system 105 may allow the storage of cargo for transportation.

Figure 2:
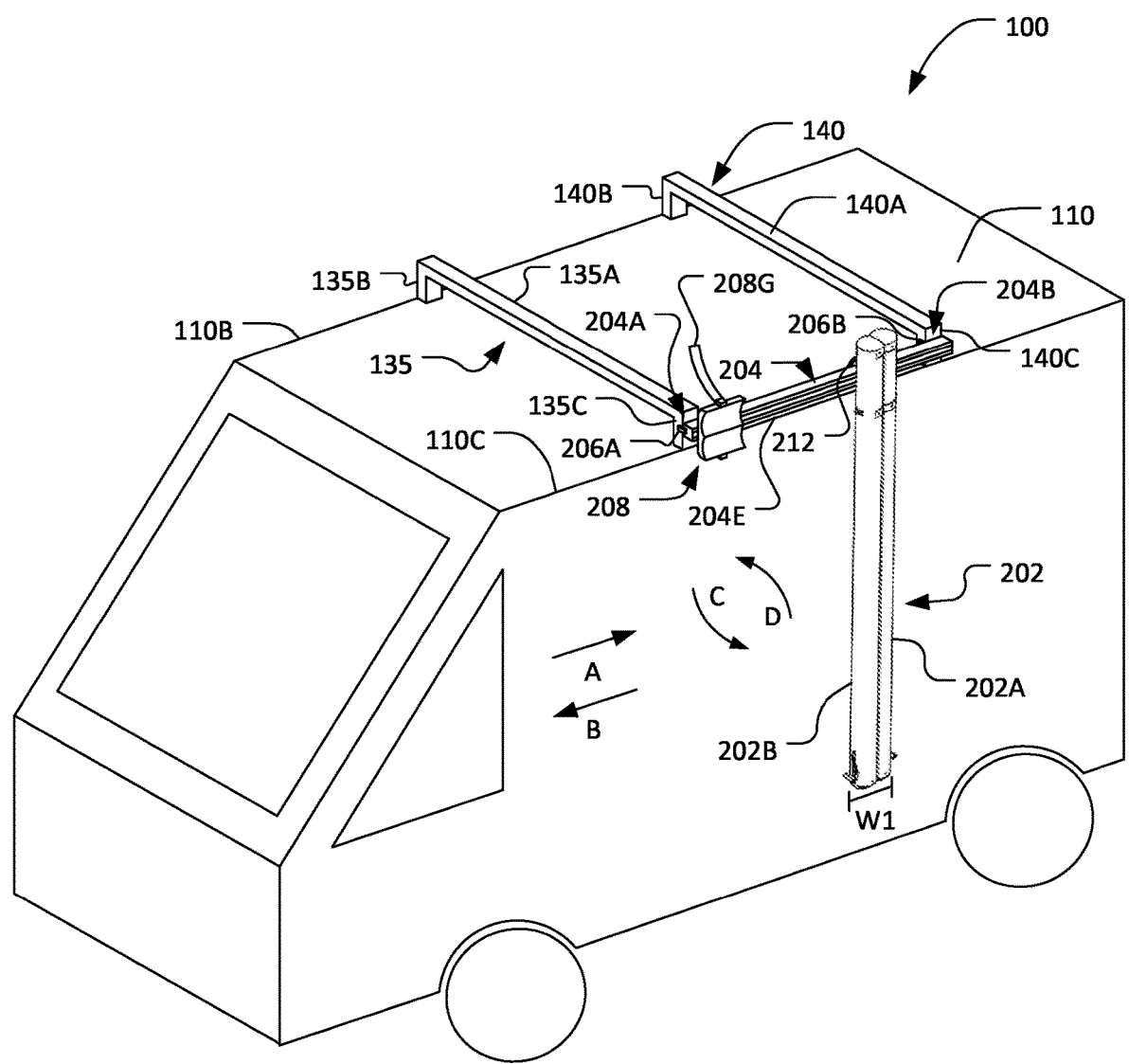
FIG. 2 is an isometric view of the vehicular ladder system of FIG. 1 with the ladder in an intermediate configuration.

As is known, a conventional roof rack system, such as the roof rack system 105, includes at least two roof racks 135 and 140. The roof rack 135 is proximate the vehicle front end 120 relative to the roof rack 140. A distance D between the front roof rack 135 and the rear roof rack 140 may vary from vehicle to vehicle (e.g., depending on the make and model of the vehicle 100, the number of roof racks installed, et cetera) and may be selectively altered by the user. Each of the front roof rack 135 and the rear roof rack 140 may have a load bearing beam or bar that extends generally laterally along the width of the vehicle 100, and two vertical members, each of which extends at or proximate one of the two opposing ends of the load bearing bar. Specifically, the roof rack 135 may have a load bearing bar 135A that extends generally laterally and vertical members 135B and 135C (FIG. 2). Vertical member 135B may extend generally vertically at or proximate one end of the load bearing bar 135A and the vertical member 135C may extend generally vertically at or proximate the other end of the load bearing bar 135A. The vertical members 135B and 135C may collectively couple the roof rack 135 to the roof 110. Similarly, roof rack 140 may have a load bearing bar 140A that extends generally laterally and vertical members 140B and 140C (FIG. 2) that extend vertically at opposing ends of the load bearing bar 140A and couple the roof rack 140 to the roof 110. The roof 110 may have opposing longitudinal edges 110B and 110C. The vertical members 135B and 140B may be aligned in a longitudinal direction of the vehicle 100 and may be disposed at or proximate the longitudinal edge 110B of the roof 110. The vertical members 135C and 140C may likewise be aligned in a longitudinal direction of the vehicle 100 and may be disposed at or proximate the longitudinal edge 110C of the roof 110.

The laterally extending roof racks 135 and 140, and specifically, the vertical members (e.g., vertical members 135B, 135C, 140B, and/or 140C) thereof, may provide a convenient and ubiquitous means to allow for the ladder system of the present disclosure, and specifically a mounting bar of the ladder system as discussed below, to be attached to the vehicle 100.

A ladder system 200 in accordance with an embodiment of the present disclosure will now be described. The ladder system 200 may comprise a ladder 202, a mounting bar 204 (see FIGS. 2 and 3), clamps 206A and 206B (see FIG. 2 and FIG. 12), a cradle 208 (see FIGS. 2 and 11), a coupler 210 (see FIG. 3 and FIG. 14), and a hook 212 (see FIG. 3 and FIG. 13). Each of these components will be described below. The ladder 202, as discussed herein, may be collapsed and expanded in a widthwise direction, and contracted and extended (i.e., telescoped) in a lengthwise direction, to selectively alter its form factor in two orthogonal directions depending on whether the ladder is to be stowed or used. Specifically, the ladder 202 may be collapsed in a widthwise direction and contracted in a lengthwise direction for stowage, and may be expanded in the widthwise direction and extended in a lengthwise direction for use.

Focus is directed to FIG. 2. To use the ladder 202 of the ladder system 200, the mounting bar 204 may first be clamped to each of the roof racks 135 and 140, and specifically, to the vertical members thereof. For example, as shown in FIG. 2, the mounting bar 204 may be clamped to the vertical members 135C and 140C such that the mounting bar 204 extends along the length of the vehicle 100 on the driver side. Alternately, the mounting bar 204 may be mounted to the vertical members 135B and 140B of the roof racks 135 and 140, respectively, such that the mounting bar 204 extends along the length of the vehicle 100 on the passenger side.

In more detail, the mounting bar 204 may have two opposing ends 204A and 204B. In embodiments, a clamp may be secured (e.g., fastened, adhesively secured, molded with, et cetera) to the mounting bar 204 at, proximate, and/or adjacent each end 204A and 204B thereof, and the clamps may be used to the secure the mounting bar 204 to the vertical members (e.g., vertical members 135C and 140C). For instance, as shown in FIG. 2, a clamp 206A may be provided at, proximate, and/or adjacent the mounting bar edge 204A, and a clamp 206B (see also FIG. 3) may be provided at, proximate, and/or adjacent the mounting bar edge 204B. The clamp 206A may be clamped to the vertical member 135C and the clamp 206B may be clamped to the vertical member 140C (see FIG. 3) to securely fasten the mounting bar 204 to the roof rack system 105. In embodiments, one or both of the clamps 206A and 206B may be movable (e.g., slidable) relative to the mounting bar 204 so as to allow the mounting bar 204 to be secured to roof rack systems 105 having varying distances D between the individual roof racks.

Figure 12:
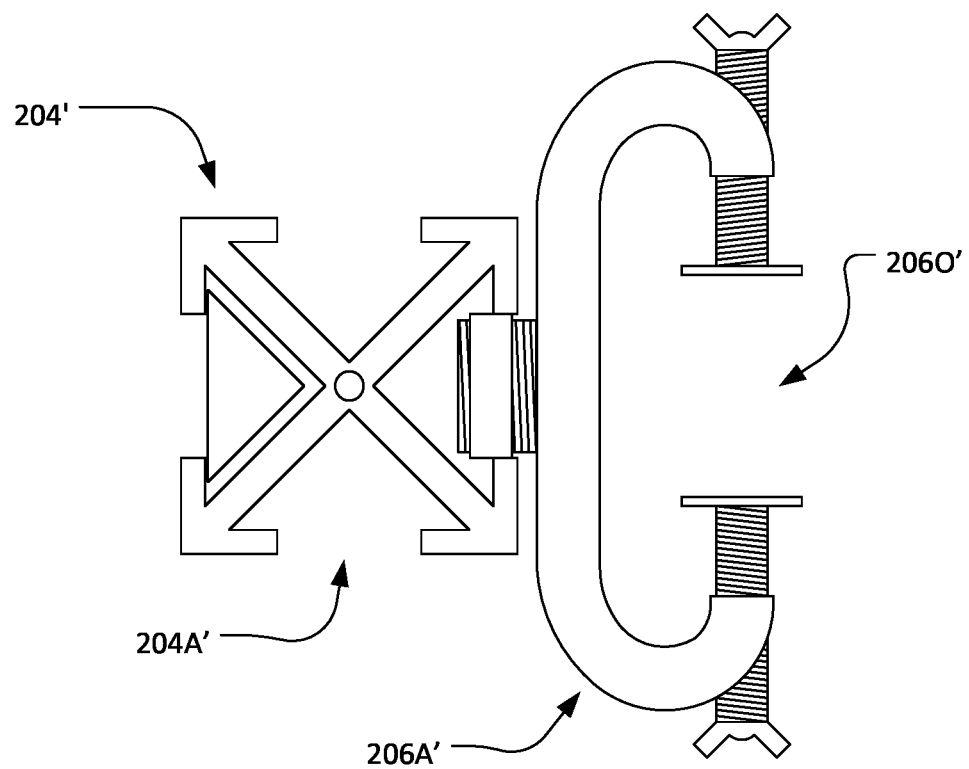
FIG. 12 is a side view of an example mounting bar and clamp of the ladder system of FIG. 1.

The clamps 206A and 206B may but need not be identical. The clamps 206A and 206B may be any type of clamps that allows the mounting bar 204 to be clamped to the vertical members of the roof racks 135 and 140 of the roof rack system 105. For example, the clamps 206A and 206B may be C-clamps, G-clamps, sash clamps, spring clamps, or any other suitable clamps. FIG. 12 shows a mounting bar 204' with a clamp 206A', which are respectively examples of mounting bar 204 and clamp 206A. As can be seen, in this example, the clamp 206' is a double-sided C-clamp that is secured to one end 204A' of the mounting bar 204' to allow this end of the mounting bar 204' to be secured to a vertical member of a roof rack. As will be appreciated, the vertical member of a roof rack (e.g., vertical member 135C of roof rack 135) may extend at least partially through opening 2060' in the clamp 206A' and the movable jaws of the clamp 206A' may be tightened to fixedly attach one end of the mounting bar 204' to the vertical member (e.g. vertical member 135C). Similarly, a clamp may be employed to secure the opposing end of the mounting bar 204' to the vertical member of a longitudinally spaced roof rack (e.g., roof rack 140 having vertical member 140C). The adjustable clamps 206A and 206B may allow for the mounting bar 204 (or 204') to be secured to roof rack vertical members of varying widths.

Typically, each opposing vertical members of a roof rack (e.g., vertical members 135B and 135C of the roof rack 135) is proximate an opposing longitudinally extending edge (e.g., longitudinal edge 110B and 110C, respectively) of the vehicle roof 110, which may allow for the ladder 202 to be stowed at or close to a longitudinal edge of the roof 110; and desirably, as discussed herein, may allow for the ladder 202 to be rotated for use without being hindered by the curvature of the roof 110. In applications where the vertical members of the roof racks are located some distance away from the longitudinal edges of the roof, spacer bars may be disposed between the mounting bar and the vertical members to allow the mounting bar to extend proximate and along a longitudinal edge of the roof 110 (e.g., longitudinal edge 110C in FIG. 1).

Figure 3:
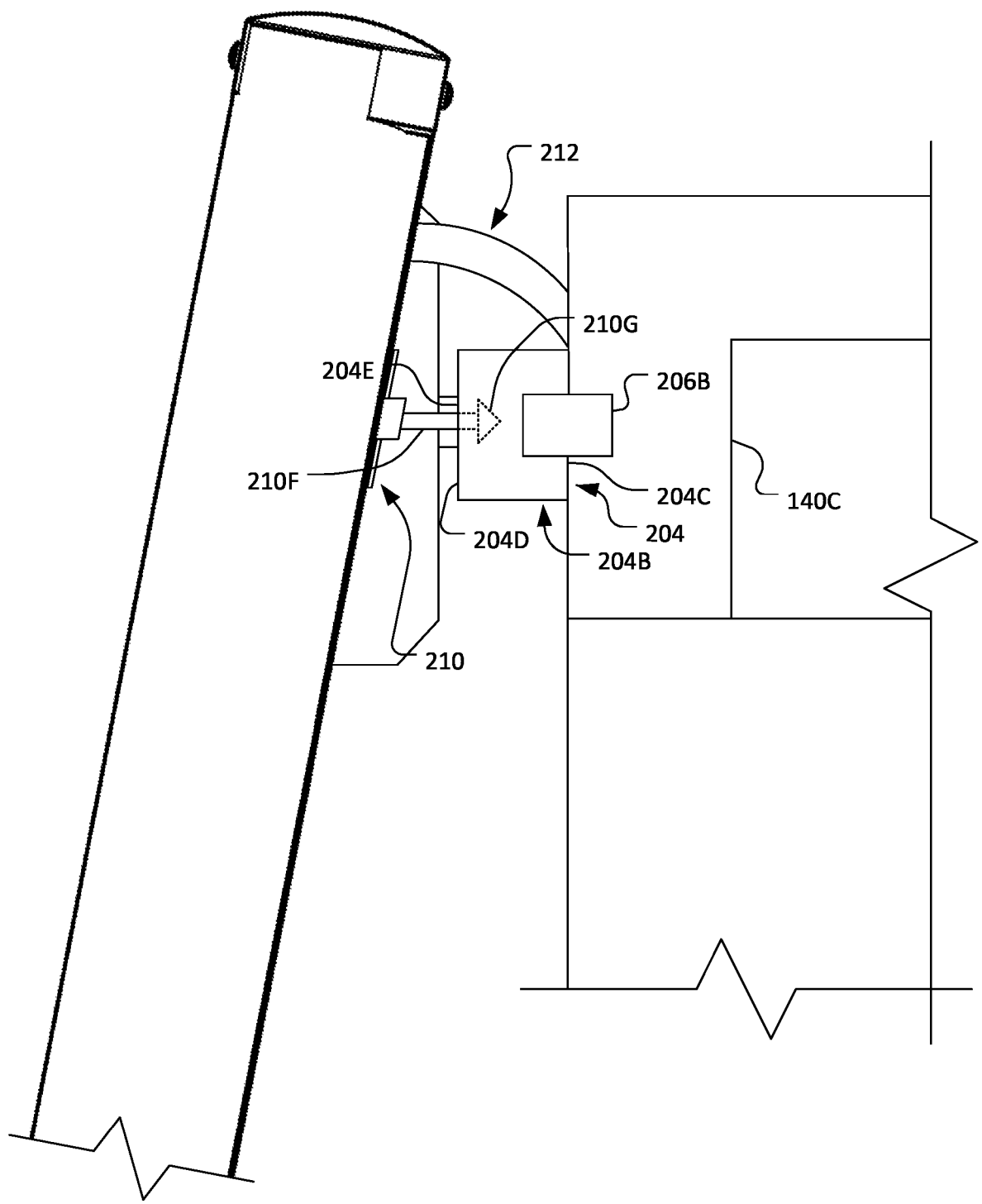
FIG. 3 is a closeup side view illustrating the coupling of the ladder of the vehicular ladder system of FIG. 1 to a mounting bar of the system.

The mounting bar 204 may have a longitudinal side 204C that, upon mounting the mounting bar 204 to the roof rack system 105, faces inboard (i.e., faces the roof racks 135 and 140), and an opposing longitudinal side 204D that faces away from the roof rack system 105 (see FIG. 3). The longitudinal sides 204C and 204D may extend along the length of the vehicle 100 (i.e., extend along one of the roof edges 110C and 110D). The mounting bar side 204D may comprise a channel 204E that extends along the length of the mounting bar 204 (see FIGS. 2 and 3). The mounting bar channel 204E may be configured for the slidable mounting of the coupler 210, and specifically, a pin thereof.

Figure 4:
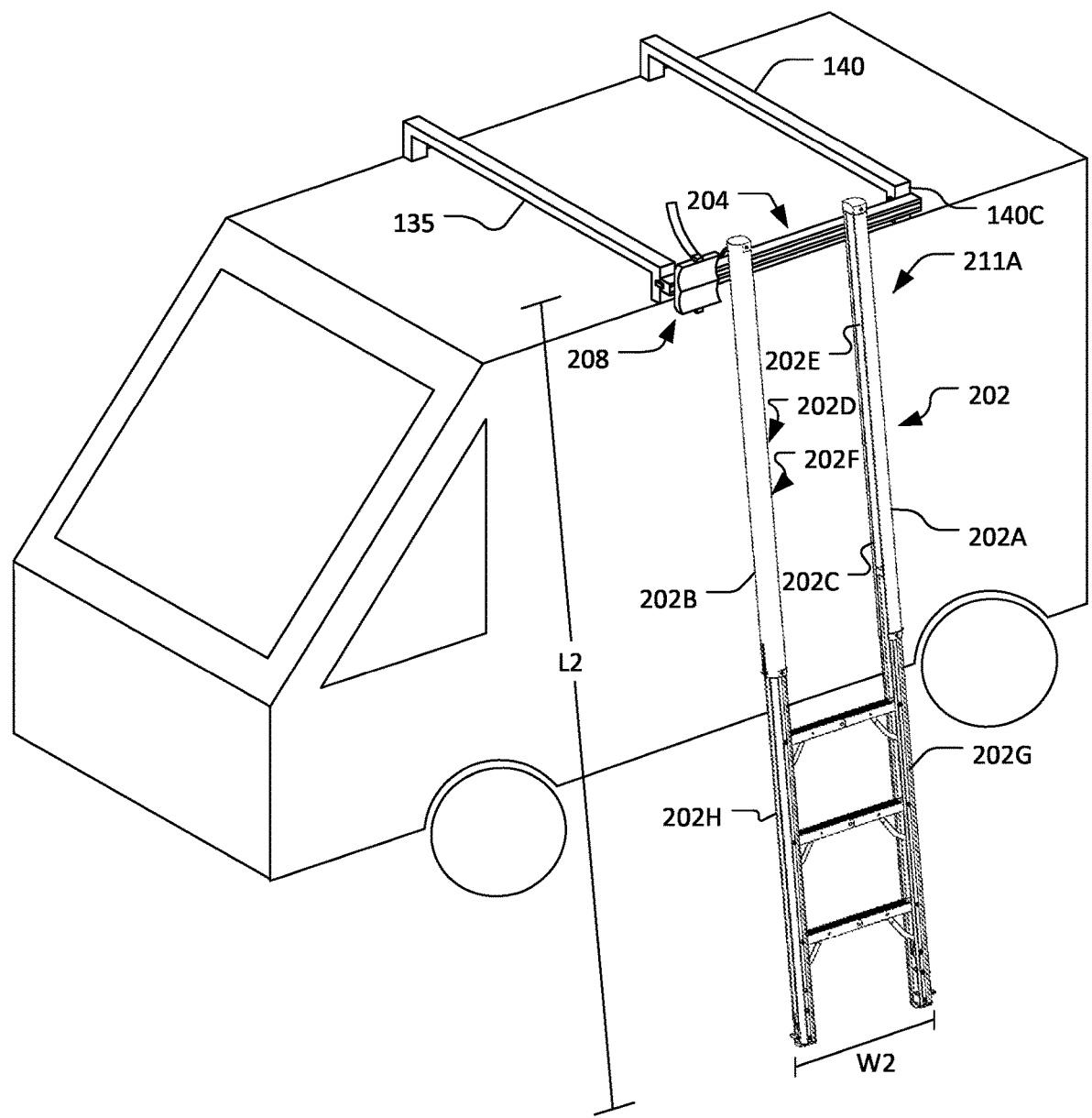
FIG. 4 is an isometric view of the ladder of FIG. 1 in a use configuration and at a first location.
Figure 5:
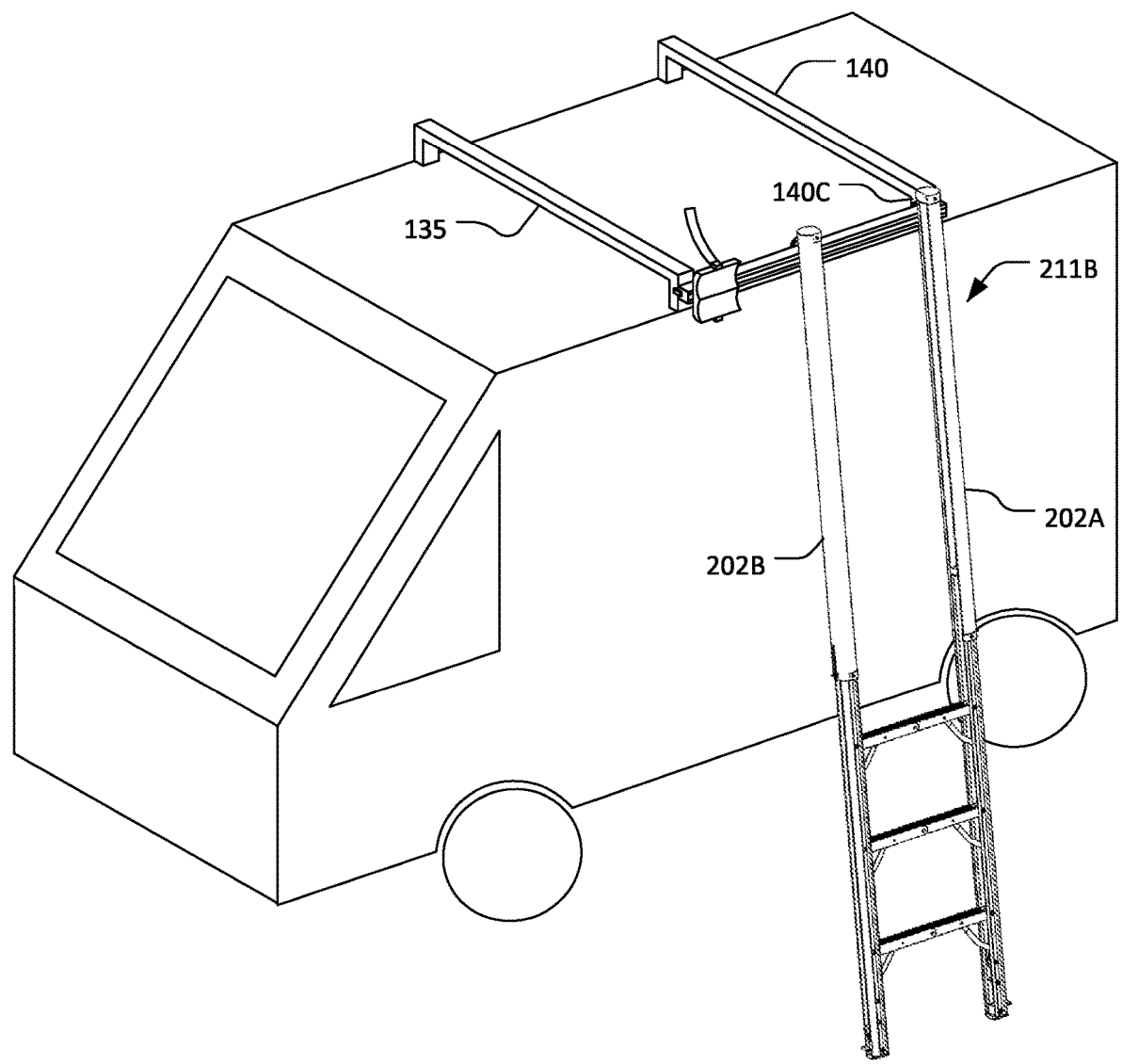
FIG. 5 is an isometric view of the ladder of FIG. 1 in a use configuration and at a second location.

In more detail, the ladder 202 may comprise a pair of side rails 202A and 202B (FIG. 3). When the ladder 202 is in a collapsed position, as shown in FIGS. 1 and 2, the side rails 202A and 202B may be proximate and/or in contact with each other. When the ladder 202 is in an expanded position, as shown in FIGS. 4 and 5, for example, the side rails 202A and 202B may rest at a greater a distance from each other. One of these ladder side rails, e.g., side rail 202A, may have the coupler 210 attached thereto. The hook 212 may be secured to the other of these ladder side rails, e.g., side rail 202B.

The coupler 210 (FIG. 14 and FIG. 3) may, in embodiments, provide for a multi-axial coupling. For example, the coupler 210 may be a ball and socket coupling or another suitable joint. The coupler 210 may have a stationary portion 210A and a movable portion 210B. The stationary portion 210A may be secured to the ladder 202, and specifically, to the side rail 202A thereof. The movable portion 210B may be slidably and pivotably coupled to the mounting bar 204, and specifically, to the channel 204E thereof. The stationary portion 210A may be stationary or fixed relative to the first side rail 202A (but may be movable together with the first side rail 202A).

The stationary portion 210A may have a socket 210C having a groove 210D. The movable portion 210B may comprise a ball 210E having a pin 210F extending therefrom. The socket 210C may be configured to receive the movable portion 210B. Specifically, the socket 210C may be configured to receive the ball 210E such that the ball 210E is pivotable multi-axially while it is housed within the socket 210C. The surface of the socket 210C may have a lip or the socket 210C may otherwise be configured to ensure that the ball 210E does not become disassociated from the socket 210C once it is pivotably retained therein.

The stationary portion 210A may comprise openings 210G and fasteners may be passed through these openings to secure the coupler 210 to the ladder side rail 202A. Alternately or additionally the stationary portion 210A may be secured to the ladder side rail 202A in another manner, e.g., using adhesives, rivets, et cetera. The pin 210F may be slidably and pivotably coupled to the mounting bar 204. Specifically, the mounting bar channel 204E may be configured to receive the pin 210F such that the pin 210F may be slid side to side along the length of the mounting bar channel 204E (in directions A and B, see FIG. 2), and may be pivoted (e.g., in a direction C or direction D, see FIG. 2) relative to the mounting bar 204 by virtue of the ball and socket joint. In embodiments, a follower 210G (FIG. 3) may be disposed within the channel 204E to ensure the pin 210F does not come out of the channel 204E while the ladder 202 is being slid and/or rotated within the channel 204E.

In this manner, the ladder 202, and specifically the side rail 202A thereof, may be slidably and pivotably mounted to the mounting bar 204. The ladder 202 may be slid side to side along the length of the mounting bar 204 and, as discussed herein, may be pivoted (e.g., rotated), to allow the ladder 202 to be deployed and otherwise repositioned for use. The groove 210D may be large enough to allow the pin 210F to extend therethrough so that the pin 210F is generally flush with the stationary portion 210A when the ladder 202 is in a stowed configuration.

In embodiments, the cradle 208 may be secured to the mounting bar at or proximate an edge thereof, e.g., edge 204A. The cradle 208 may be adjacent the channel 204E, i.e., may be disposed such that it faces away from the vehicle 100. The cradle 208 may be configured to securely retain the ladder 202 while the ladder is in a stowed position (e.g., as in FIG. 1).

Figure 11:
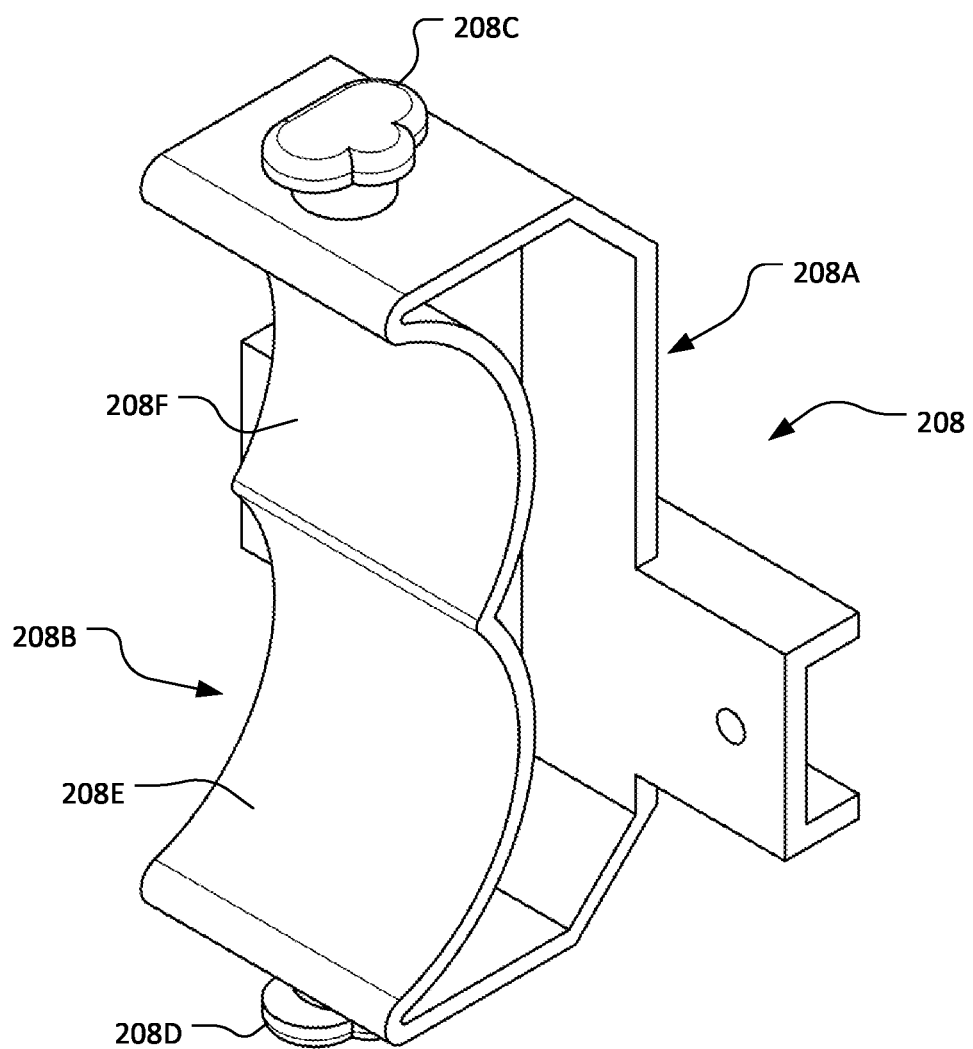
FIG. 11 is an isometric view of a cradle of the ladder system of FIG. 1.

FIG. 11 shows the example cradle 208 in more detail. The cradle 208 may have a base member 208A and a cradling member 208B. The base member 208 may comprise two opposing surfaces each of which may include a nub 208C and 208D. The cradling member 208B may generally be in the shape of a rounded W, and may include two concave holders 208E and 208F. The base member 208A may be secured to the mounting bar 204, e.g., at or proximate the mounting bar edge 204A by fastening or otherwise securing the base member 208A to the mounting bar 204, such that the cradling member 208B faces away from the vehicle 100. While the ladder 202 is in the contracted position and extends along the roof edge (e.g., roof edge 110C) as in FIG. 1, one of the ladder side rails (e.g., side rail 202A) may be housed within one cradling member (e.g., cradling member 208E) and the other of the ladder side rails (e.g., side rail 202B) may be housed within the other cradling member (e.g., cradling member 208F). A strap 208G (see FIGS. 1 and 2) may be secured to each of the nubs 208C and 208D to ensure the ladder 202 remains securely in place (i.e., remains cradled by the cradle 208) as the vehicle 100 traverses various types of terrain.

As described above, one of the ladder side rails, e.g., ladder side rail 202A, may have a coupler 210 attached thereto to allow the side rail to be slidably and pivotably coupled to the mounting bar 204 via its channel 204E. The other ladder side rail, e.g., ladder side rail 202B, may have the hook 212 secured thereto (see FIG. 3 and FIG. 12). The hook 202B may allow the ladder side rail 202B to move relative to the mounting bar 204 (e.g., in directions A, B, C, and D).

Figure 13:
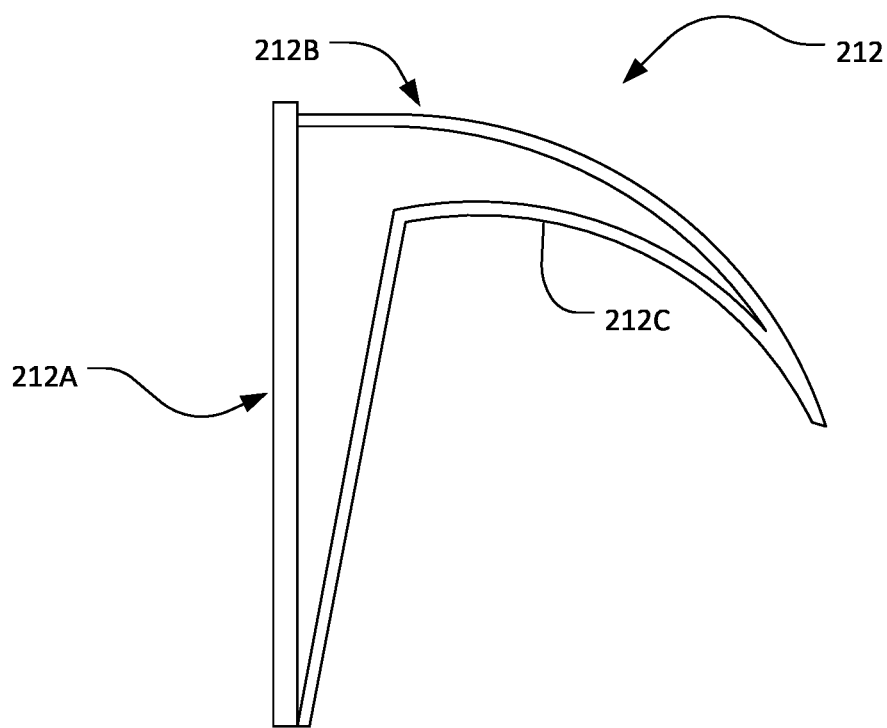
FIG. 13 is a side view of an example hook of the ladder of the ladder system of FIG. 1.
Figure 14:
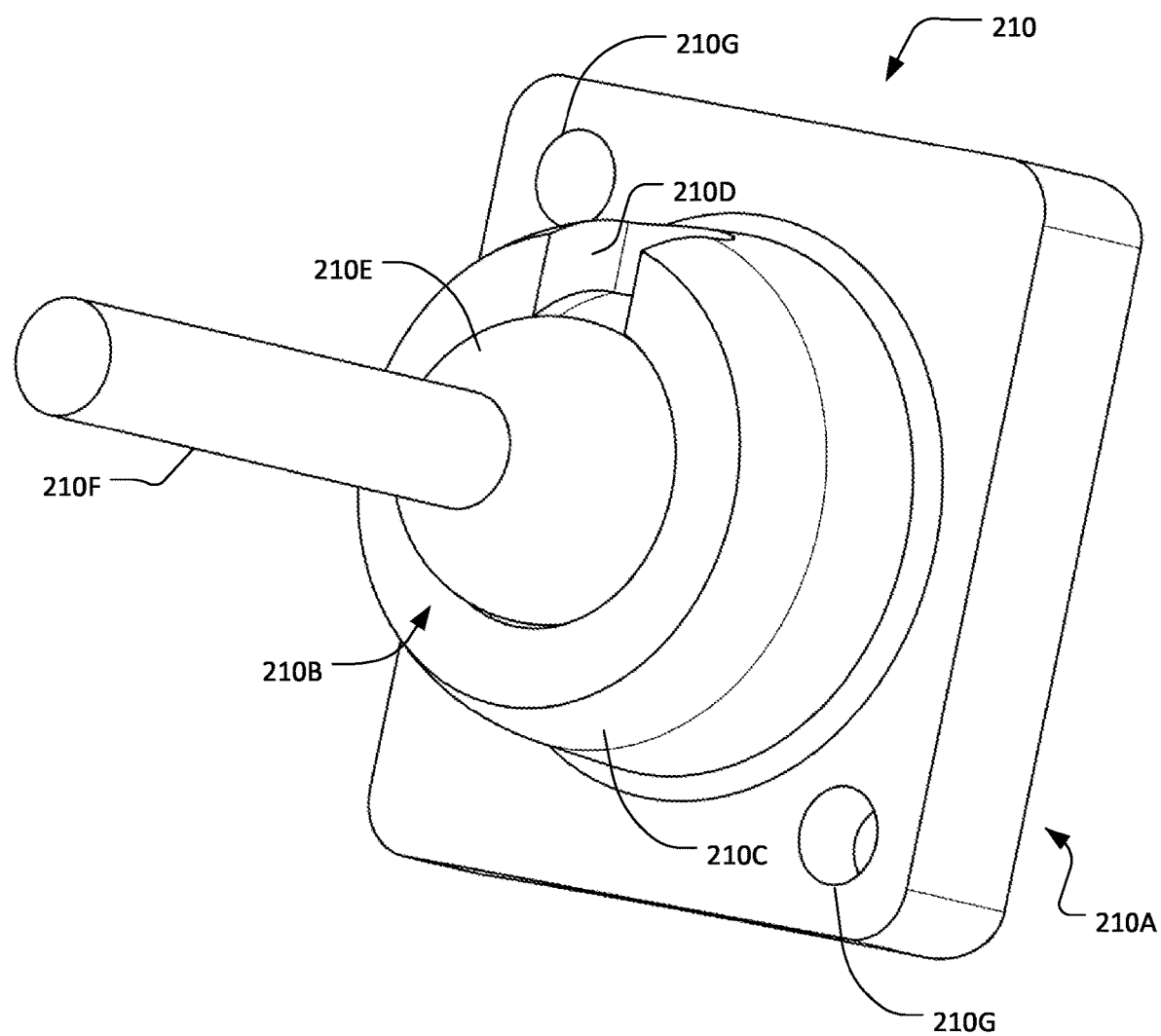
FIG. 14 is an isometric view of an example coupler of the ladder of the ladder system of FIG. 1.

As shown in FIG. 13, the hook 212 may comprise a fastening member 212A and a curved or catching member 212B. The fastening member 212A may be fastened to the ladder 202, and specifically, to the side rail thereof to which the coupler 210 is not coupled (e.g., as shown in the figures, the coupler 210 may be coupled to side rail 202A and the hook fastening member 212A may be coupled to side rail 202B). The curved member 212B of the hook 212 may be configured to be supported by the mounting bar 204 when the ladder 202 is in use. Specifically, the curved member 212B may have an inner surface 212C that may be made to contact the mounting bar 204. One of the side rails 202A of the ladder 202 may thus be slidably and pivotably coupled to the mounting bar 204 via the coupler 210 and the other of the side rails 202B of the ladder 202 may be supportably, separably, and movably coupled to the mounting bar 204 via the hook 212. In practice, the ladder side rail 202B may be separated from the mounting bar 204 and moved relative to the mounting bar 204 along with the side rail 202A, and the hook 212 may thereafter be hooked to the mounting bar 204 in preparation of use of the ladder 202. Both side rails 202A and 202B may therefore be supported by the mounting bar 204. The mounting bar 204, the coupler 210, and the hook 212 may be sufficiently sturdy to support the weight of the ladder 202 while a user is standing thereon.

The coupler 210 and the hook 212 may collectively allow the ladder 202 to be moved along the mounting bar 204 and to be supported at different locations along the mounting bar 204. For example, as shown in FIG. 4, the ladder 202 is fully assembled and is at a location 211A such that its side rail 202A is spaced apart from the roof rack 140, and specifically, the vertical member 140C thereof. In FIG. 5, conversely, the ladder 202 is displaced relative to the mounting bar 204 as compared to FIG. 4 and is at a location 211B where the side rail 202A is proximate the roof rack vertical member 140C. The coupler 208 and the hook 212 of the ladder 202 may both be supported by the mounted bar 204 at each of the locations 211A and 211B, and in like manner, at other locations along the mounting bar 204.

To store the ladder 202, the length of the ladder 202 may need to be reduced. The ladder 202 may fold onto itself to reduce its length or it may telescope into itself to a reduced length. For example, portions of the ladder 202 may store inside other portions of the ladder 202 such that the design is a telescoping design. The ladder 202 may lock in an extended position and in a telescoped position. Alternatively, the ladder 202 may fold out to extend its length. The length of the ladder 202 during storage may be small enough to allow the ladder 202 to be easily stored on the roof 110 of the vehicle 100. The length of the ladder 202 may vary depending on vehicle make and model of the vehicle 100. For example, a larger vehicle 100 may require a longer length of the ladder 202 whereas a smaller vehicle 100 may not have the need for same length and therefore may have a shorter length.

In an embodiment, each of the side rails 202A and 202B may be generally hollow tubes. More specifically, each of the side rails 202A and 202B may be frusto-cylindrical and, in addition to being hollow, have a slit 202C and 202D that respectively extends in the surface of the side rails along the length thereof (FIG. 4). Slit 202C in the surface of side rail 202A may face the slit 202D in the surface of side rail 202B (slit 202D is not clearly visible in FIG. 4, but as will be understood, faces opening 202C and is generally identical thereto). The slit 202C may allow for opening 202E within the hollow side rail 202A to be accessed and the slit 202D may likewise allow for opening 202F within the hollow side rail 202B to be accessed. The opening 202E may be configured to slidably receive a slidable support 202G and opening 202F may be configured to slidably receive a slidable support 202H to allow the slidable supports 202G and 202G to telescope.

Figure 6:
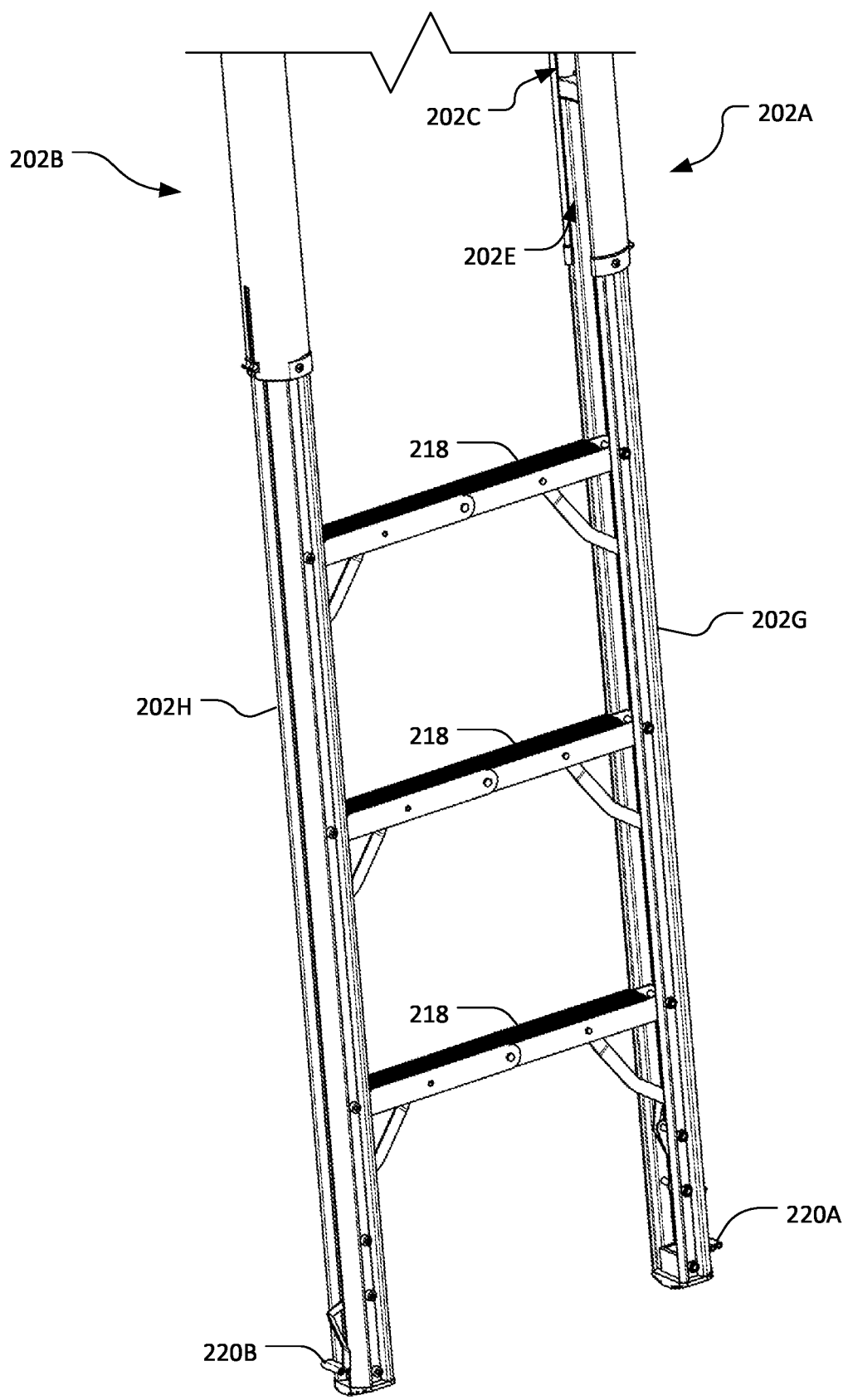
FIG. 6 is an isometric view illustrating telescoping members of the ladder of FIG. 1.

In more detail, and as shown in FIG. 6, side rail 202A, and specifically the opening 202E thereof, may be configured to slidably receive slidable support 202G. In the same manner, side rail 202B may be configured to slidably receive slidable support 202H. A plurality of rungs 218 may extend between the slidable supports 202G and 202H. When the slidable supports 202G and 202H are respectively slid into the openings 202F and 202F, the movement of the supports 202G and 202H may not be obstructed by the rungs 218 because of the slits 202C and 202D in the side rails 202A and 202B, respectively.

In embodiments, and as shown in FIG. 6, a handle 220A may be associated with slidable support 202G and a handle 220B may be associated with slidable support 202H. The handles 220A and/or 220B may be used to pull out the slidable supports 202G and 202G from their respective openings 202E and 202F to extend the length of the ladder (see, e.g., length L1 of the ladder 202 in a stowed configuration (FIG. 1) and a longer length L2 of the ladder 202 in an extended configuration (FIG. 4).

As described above, in addition to being retractable and extendable in a lengthwise direction (i.e., telescoped), the ladder 202 may be collapsed and expanded in a widthwise direction (see width W1 of collapsed ladder 202 in FIG. 2 and width W2 of expanded ladder 202 in FIG. 4). Specifically, the side rail 202A may be separably coupled to the side rail 202B via the rungs or steps 218. The rungs 218 may be collapsible. The collapsible rungs 218 may accordion into a retracted position allowing the first support 202A and second support 202B to come together (i.e., collapse) for storage (see FIG. 1). The rungs 218 may likewise be extended so as to separate the side rail 202A from the side rail 202B (see FIG. 4) and likewise separate the slidable member 202G from slidable member 202H. In embodiments, the rungs 218 may be locked when in the expanded position to support the weight of the user as the user climbs thereon. After use, and when the ladder 202 is to be stowed, the ladder 202 may be collapsed, i.e., the rungs 218 may be accordioned and retracted and the slidable supports 202G and 202H may be slid respectively into openings 202E and 202F for storage of the ladder 202.

Figure 8:
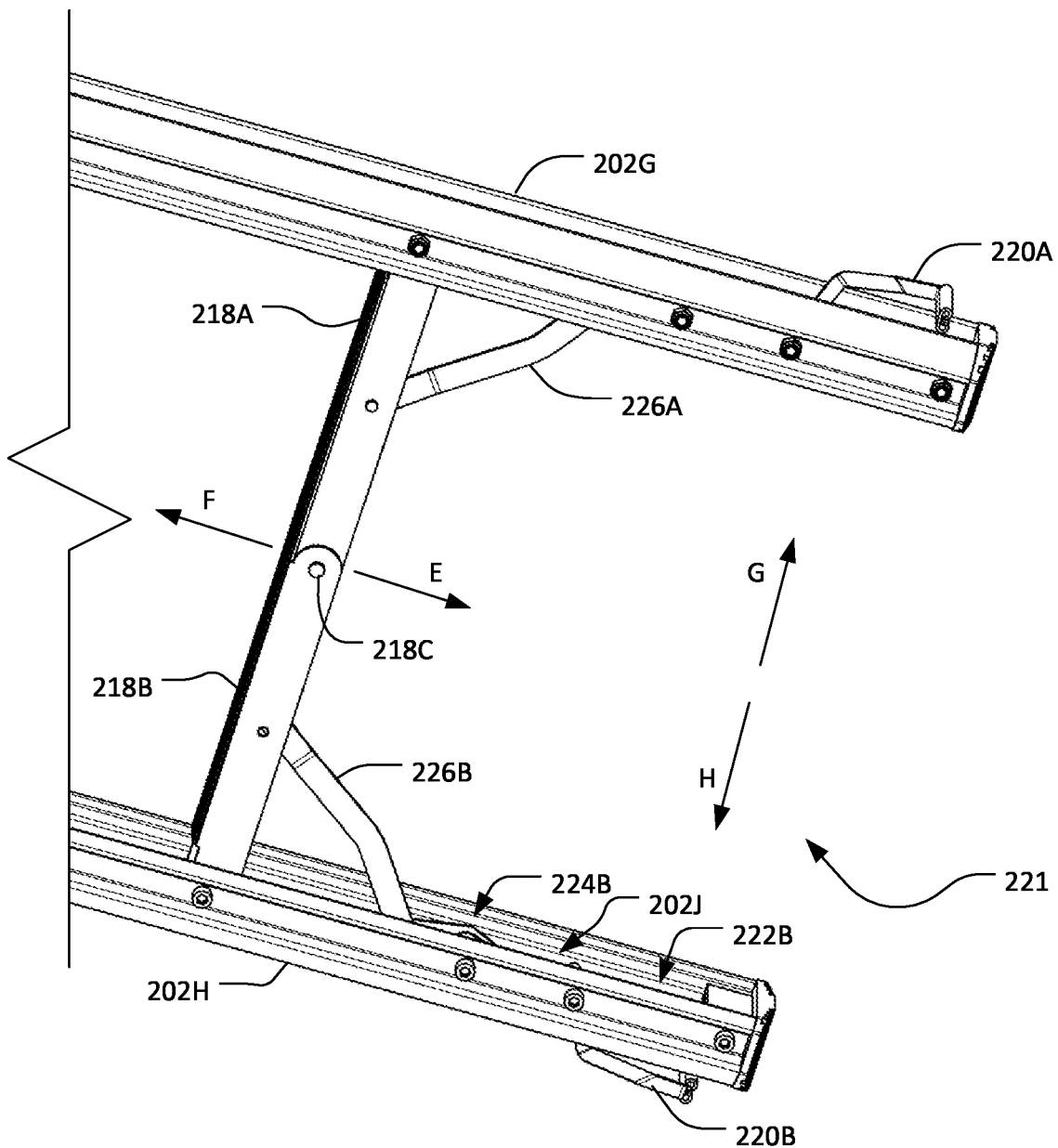
FIGS. 8 and 9 are isometric views of a locking system of the ladder of FIG. 1 configured to allow the ladder to collapse in a stowed configuration and expand in a use configuration.
Figure 9:
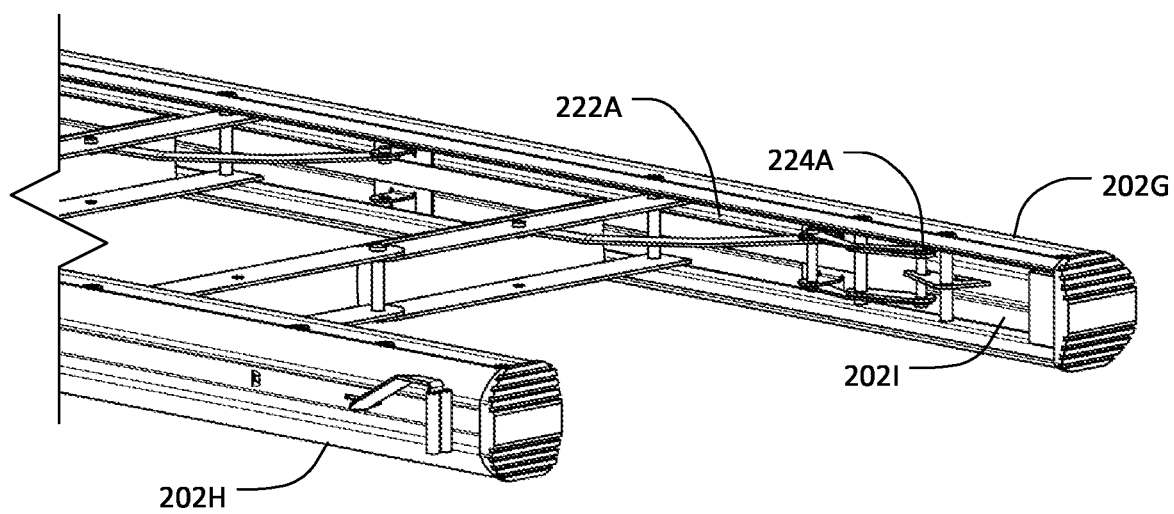
Figure 10:
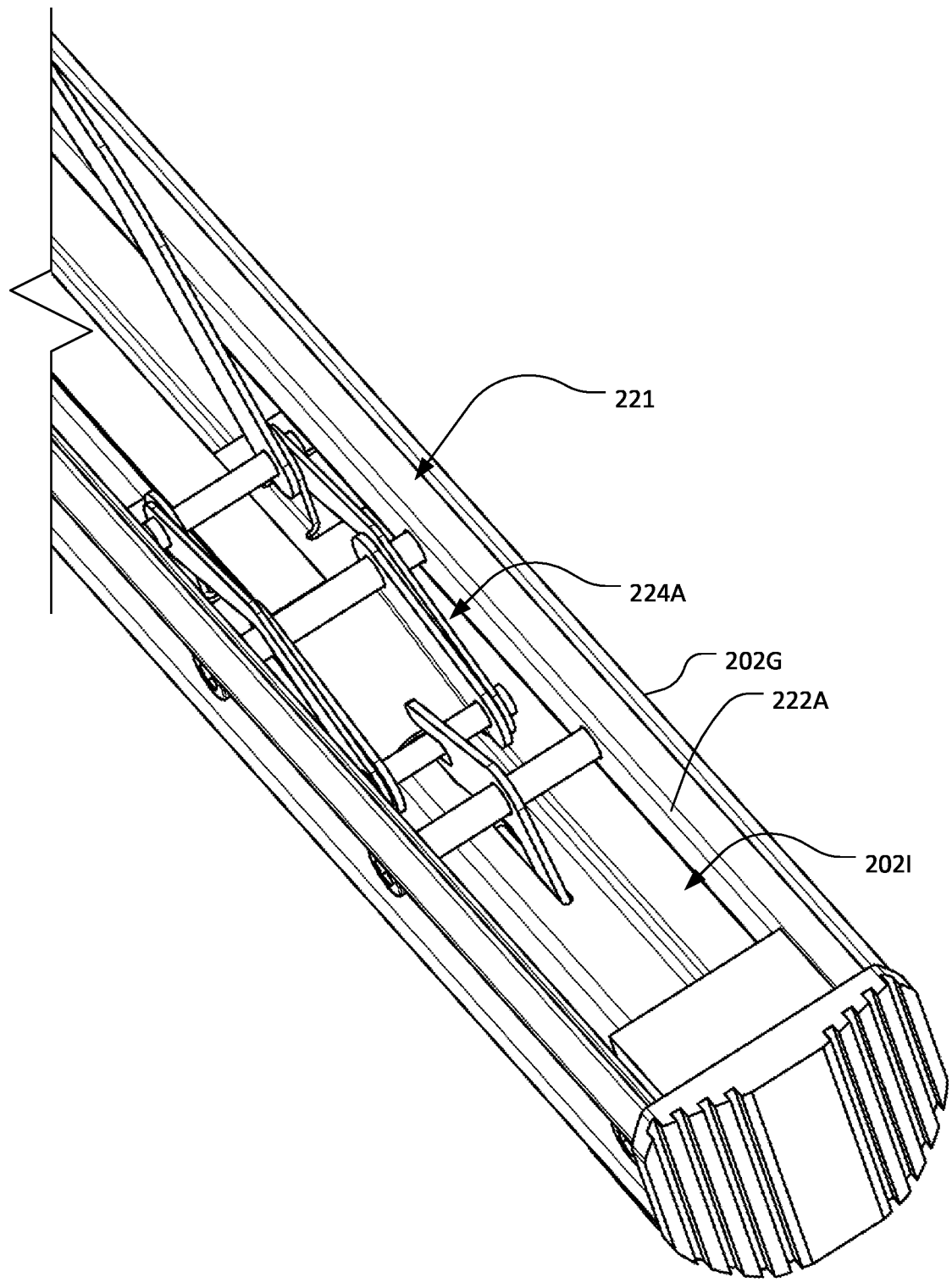
FIG. 10 is a closeup isometric view of the locking system of FIG. 8.

Focus is directed to FIGS. 8-10 to illustrate a locking system 221 configured to allow for the rungs 218 to be expanded from their collapsed position and locked for use. The locking system 221 may comprise the rungs 218, slidable bars 222A and 22B, levers 224A and 224B, and retractable linkages 226A and 226B.

As can be seen, the slidable support 202G may have an opening 202I and the slidable support 202H may have an opening 202J. A slidable bar 222A may be housed in the opening 202I of slidable support 202G and a slidable bar 222B (see FIG. 8) may likewise be housed in the opening 202J of slidable support 202H.

Each collapsible rung 218 may have a first portion 218A and a second portion 218B that are pivotably coupled to each other (using, e.g., pin 218C, see FIG. 8). Each of the rungs 218 may be coupled to both the slidable bars 222A and 22B. Specifically, the first portion 218A of each rung 218 may be coupled to the slidable bar 222A and the second portion 218B may be coupled to the slidable bar 222B.

The slidable bar 222A may have associated therewith levers 224A and the slidable bar 222B may have associated therewith levers 224B. The first portion 218A of each rung 218 may be retractably coupled to the levers 224A via retractable linkage 226A and the second portion 218B of each rung 218 may be retractably coupled to the levers 224B via retractable linkage 226B.

When the ladder 202 is in the storage position, as in FIG. 1, the rung first and second portions 218A and 218B and the linkages 226A and 226B may each be retained within the openings 202I and 202J of slidable supports 202G and 202H, and the slidable supports 202G and 202H may themselves be retained within the openings 202E and 202F of the side rails 202A and 202B, respectively. The user may extend the ladder 202 in a lengthwise direction by pulling the slidable supports 202G and 202H in direction E (see FIG. 8) to cause the slidable supports to telescope (using, e.g., the handles 220A and 220B), and then expand the ladder in a widthwise direction by separating the slidable supports 202G and 202H from each other in directions G and H, respectively. When so expanded, the rungs 218 may lock at the pin 218C such that the rung portions 218A and 218B are no longer movable relative to each other (e.g., the slidable bars 222A and 222B may abut the bottom of their respective openings 202E and 202F to curtail further movement of the rungs 218). Alternately, the user may first expand the ladder in a widthwise direction by separating the slidable supports 202G and 202H from each other in directions G and H, respectively, and then extend the ladder in the lengthwise direction by telescoping the slidable supports 202G and 202H. Similarly, when the ladder 202 is to be configured in a stowed configuration, it may be collapsed and then retracted, or may be retracted and then collapsed. Where the ladder 202 is first retracted and then collapsed, the slits 202C and 202D within the side rails 202A and 202B may ensure the rungs 218 do not impede the retraction of the ladder 202.

The levers 222A and 224B may facilitate the accordioning or collapsing of the rungs 218 and the expansion thereof. Specifically, when the rungs 218 are to be collapsed, a force may be applied in direction F, which may unlock the rungs 218. The slidable members 202G and 202H may then be pushed towards each other, which may cause the linkages 226A and 226B to retract such that the first and second rung portions 218A and 218B both extend upwardly at an angle to the pin 218C (i.e., the first and second rung portions 218A and 218B may initially form an upside-down V). When so folded, the first and second rung portions 218A and 218B may be proximate (and may be in contact with) each other and may fit within the openings 202I and 202H in the slidable support members 202G and 202H.

In embodiments, the slidable members 202G and 202H may have gripping feet 202K and 202L (e.g., feet made of rubber or other anti-skid material) at a terminal portion thereof to ensure the ladder 202 does not slip while it is in the use configuration.

Figure 15:
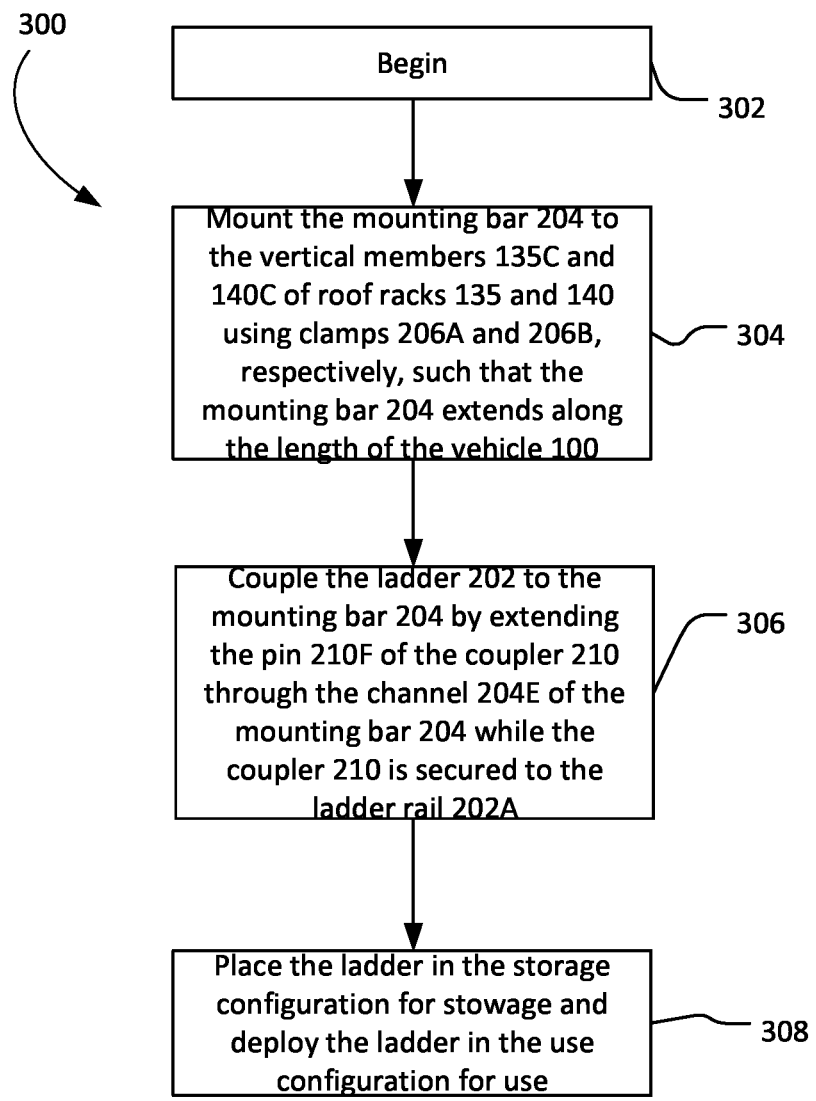
FIG. 15 is a flowchart illustrating the setup of the vehicular ladder system of FIG. 1.

Now that the various components of the ladder system 200 have been described, methods will be detailed to illustrate use of the system 200. Focus is directed to FIG. 15 that details a method 300 of setting up the ladder system 200 for use. The method 300 may begin at step 302. At step 304, prior to using the ladder 202 of the ladder system 200, the mounting bar 204 may be affixed to the roof racks 135 and 140. Specifically, at step 304, clamps 206A and 206A may be employed to mount the mounting bar 204 to the vertical members 135C and 140C of roof racks 135 and 140, respectively, such that the mounting bar 204 extends along the length of the vehicle 100.

At step 306, the ladder 202 may be coupled to the mounting bar 204 by extending the pin 210F of the coupler 210 through the channel 204E of the mounting bar 204 while the coupler 210 is secured to the ladder rail 202A. At step 308, the ladder 202 may be placed in the storage configuration for stowage and deployed in the use configuration for use, as discussed herein.

Figure 16:
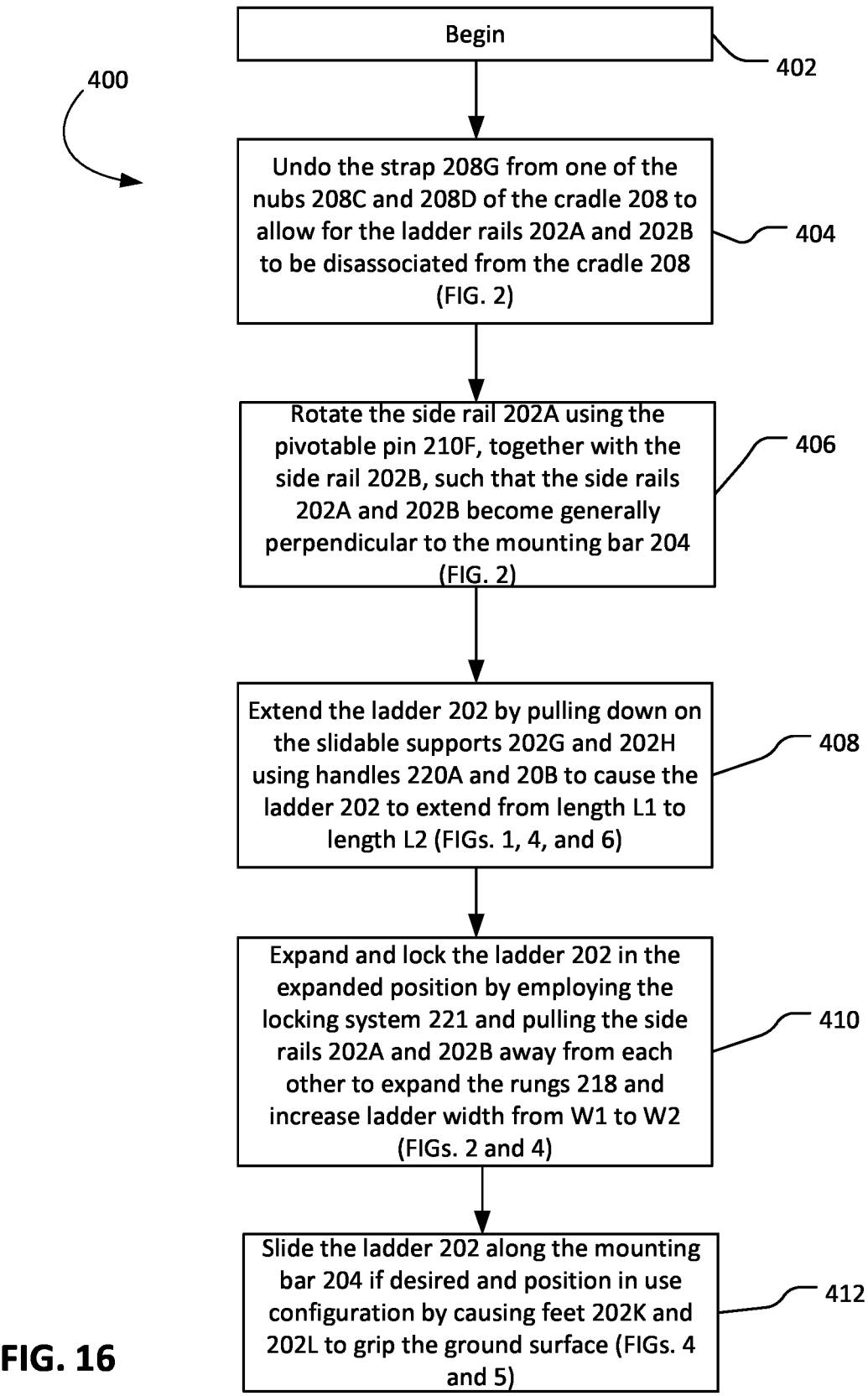
FIG. 16 is a flowchart illustrating a method of using the ladder of the vehicular ladder system of FIG. 1.

FIG. 16 illustrates a method 400 of placing the ladder 202 from its stowed configuration (as in FIG. 1) to its deployed or use configuration (as in FIG. 4). It will be assumed that at the start of the method 400 the ladder 202 is: (a) in its retracted and collapsed position; (b) secured to and stowed along the mounting bar 204 (i.e., extends along the length of the vehicle 100 and is generally parallel to the mounting bar 204); and (c) secured to the cradle 208 using strap 208G.

The method 400 may begin at step 402 and at step 404 the user may undo strap 208G from one of the nubs 208C and 208D of the cradle 208 to allow for the ladder rails 202A and 202B to be disassociated from the cradle 208 (FIG. 2). At step 406, the user may rotate the side rail 202A using the pivotable pin 210F, and rotate the side rail 202B together with the side rail 202A, such that the side rails 202A and 202B extend generally perpendicularly to the mounting bar 204 (FIG. 2). At step 408, the user may extend the ladder 202 by pulling down on the slidable supports 202G and 202H using handles 220A and 20B to cause the ladder 202 to extend from length L1 to length L2 (FIGS. 1, 4, and 6).

At step 410, the user may expand and lock the ladder 202 in the expanded position by employing the locking system 221 and pulling the side rails 202A and 202B away from each other to expand the rungs 218 and increase ladder width from W1 to W2 (FIGS. 2 and 4). Expansion of the rungs 218 associated with the slidable supports 202G and 202H may cause the side rails 202A and 202B to also become distanced from each other. The ladder 202 may now be ready for use. At step 412, the user may slide the ladder 202 along the mounting bar 204 if desired and position the ladder 202 in the use configuration by causing feet 202K and 202L to grip the ground surface (FIGS. 4 and 5). As described above, while the flowchart of FIG. 16 indicates the ladder 202 is first extended and then expanded for placing the ladder 202 from the storage configuration to the use configuration, the ladder 202 alternately may be first expanded and then extended to place it from the storage configuration to the use configuration.

After the user has used the ladder 202, the user may store the ladder 202 in the storage configuration by essentially reversing the steps of the method 400. Specifically, the user may unlock the ladder 202 and collapse the ladder 202 in the widthwise direction by pulling the slidable supports 202G and 202H (and/or the side rails 202A and 202B) towards each other. The user may then retract the ladder 202 by pushing the slidable supports 202G and 202H into the openings 202E and 202F of the hollow side rails 202A and 202B, respectively. Alternately, the user may first retract the ladder 202 and then collapse the rungs 218 thereof. Once the ladder 202 is in an intermediate configuration (FIG. 2), the user may rotate the ladder 202 (e.g., in a counter-clockwise direction) such that the ladder 202 extends along the length of the vehicle 100 generally parallel to the mounting bar 204. The user may cradle one side rail 202A and 202B in one of the cradling members 202E and 202F and the other side rail in the other cradling member of the cradle 208 and then secure the strap 208G to the cradle nubs 208C and 208D to place the ladder in the storage or stowed configuration. When so stowed, the ladder 202 may securely be transported with the vehicle 100 without taking any space within the vehicle interior or appreciably degrading the aerodynamics of the vehicle. Further, storing the ladder 202 in this fashion may ensure the ladder 202 does not take storage space of the roof rack system 105 intended to be used for other cargo.

Figure 7:
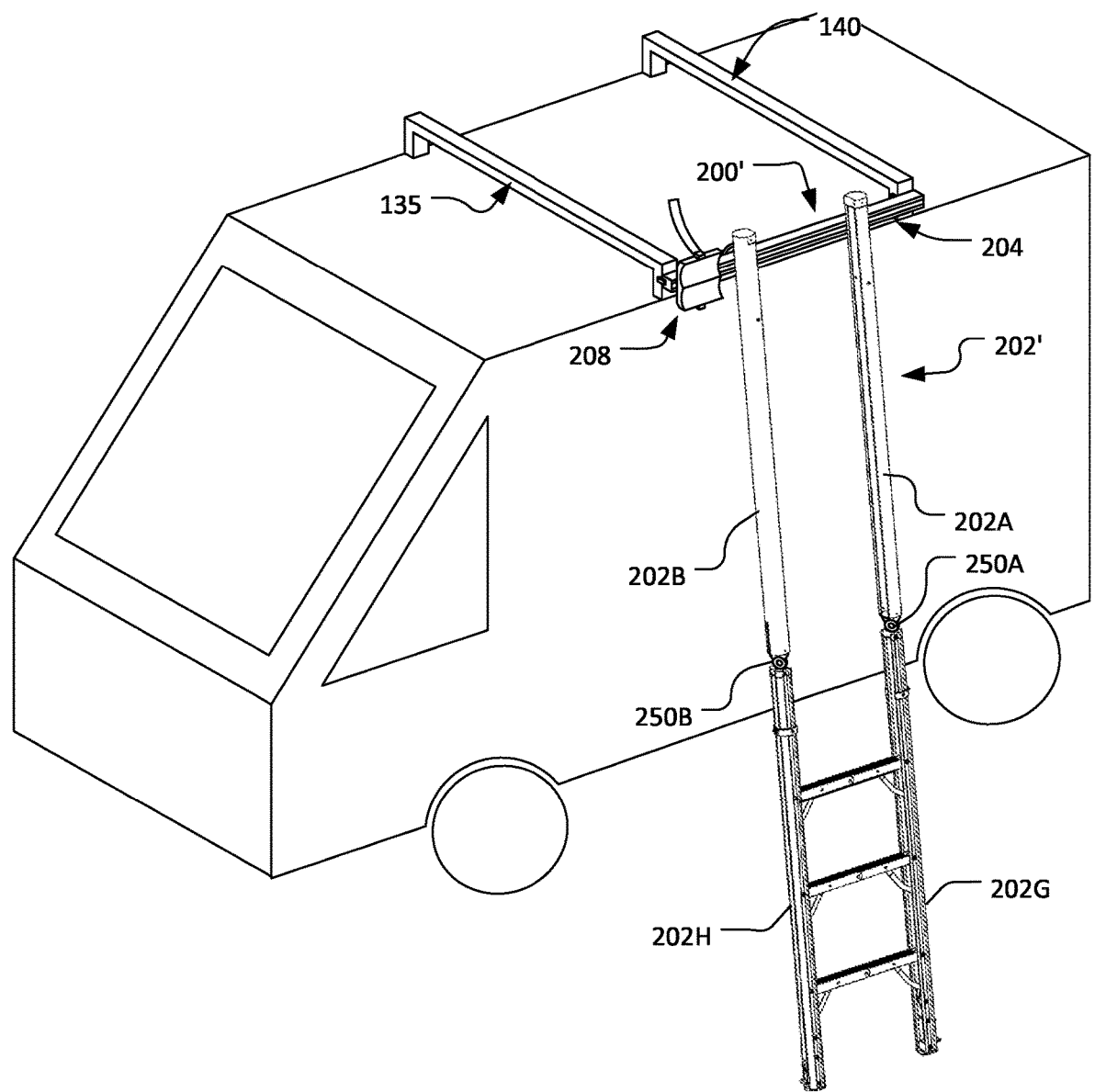
FIG. 7 is an isometric view of a ladder of a vehicular ladder system, according to another embodiment.

Focus is directed now to FIG. 7 which shows an alternate embodiment 200' of the vehicular ladder system 200. The ladder system 200' is generally identical to the ladder system 200, except as noted or described, and/or would be inherent. Corresponding reference numbers indicate corresponding parts, though with any noted deviations.

The ladder system 200' may, like the ladder system 200, have a mounting bar 204 that is coupled to the vertical members of the roof racks 135 and 140, a cradle 208, et cetera. Further, the ladder 202' of the ladder system 200', like the ladder 202 of the ladder system 200, may comprise side rails 202A and 202B and slidable supports 202G and 202H that may fit within openings of the side rails 202A and 202B. The ladder 202', akin to the ladder 202, may be collapsed and expanded in a widthwise direction, and contracted and extended (i.e., telescoped) in a lengthwise direction.

The primary difference between the ladder 202' and ladder 202 may be that in ladder 202', the slidable members 202G and 202H may, when they are in their extended position, be configured to pivot with respect to side rails 202A and 202B. Specifically, a joint 250A may pivotably couple the side rail 202A to slidable support 202G and a joint 250B may pivotably couple the side rail 202B to slidable support 202H. The slidable supports 202G and 202H may, by virtue of the joints 250A and 250B, selectively and collectively swivel with respect too the side rails 202A and 202B. As can be appreciated, certain vehicles may have a side surface that is not perpendicular to the roof of the vehicle, but instead, is angled outward. The joints 250A and 250B may allow for the ladder 202', and specifically the slidable members 202G and 202H thereof, to be further distanced from the vehicle relative to the ladder 200 to account for the design of such vehicles. When the ladder 202' is to be retracted, the joints 250A and 250 may be slid within the openings of the side rails 202A and 202B along with the slidable supports 202G and 202H.

In this way, thus, the ladder system 200 (and 200') may allow for a user to conveniently transport a ladder with the vehicle and access the contents of a roof rack. Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all steps listed in the various figures need be carried out in the specific order described.

The disclosure claimed is:

1. A ladder system for a vehicle, said vehicle having a roof rack system including a front roof rack and a rear roof rack, said front roof rack having a front vertical member and said rear roof rack having a rear vertical member, said ladder system comprising:
   a mounting bar having a channel extending along a length of said mounting bar;
   a pair of clamps configured to mount said mounting bar to said front vertical member and said rear vertical member such that said mounting bar extends along a length of said vehicle; and
   a ladder comprising a first side rail, a second side rail, a first slidable member configured to slide within said first side rail, a second slidable member configured to slide within said second side rail, a coupler secured to said first side rail and configured to slidably and pivotably couple said first side rail to said channel, and a hook coupled to said second side rail and configured to hook said second side rail to said mounting bar when said ladder is in a use configuration;
   wherein:
   said ladder is selectively retractable in a lengthwise direction and selectively collapsible in a widthwise direction;
   said first slidable member and said second slidable member are collectively pivotable relative to said first side rail and said second side rail; and
   in a stowed configuration, said ladder extends parallel to said mounting bar.

2. The ladder system of claim 1, further comprising a cradle coupled to said mounting bar.

3. The ladder system of claim 2, wherein said cradle comprises a pair of cradling members.

4. The ladder system of claim 3, wherein each of said pair of cradling members has a concave surface configured to retain one of said first side rail and said second side rail.

5. The ladder system of claim 4, wherein said cradle has a pair of nubs to which a strap is secured when said ladder is in a stowed configuration.

6. The ladder system of claim 1, wherein said coupler comprises a ball and socket joint.

7. The ladder system of claim 6, wherein said ball has a pin configured to slide within said channel.

8. The ladder system of claim 1, further comprising a handle associated with each of said first slidable member and said second slidable member configured to allow said first slidable member and said second slidable member to be respectively pulled out of said first side rail and said second side rail.

9. A ladder system for a vehicle, said vehicle having a roof rack system including a front roof rack and a rear roof rack, said front roof rack having a front vertical member and said rear roof rack having a rear vertical member, said ladder system comprising:
- a mounting bar having a channel extending along a length of said mounting bar;
- a pair of securing members configured to secure said mounting bar to said front vertical member and said rear vertical member such that said mounting bar extends along a length of said vehicle; and
- a ladder comprising a first side rail, a second side rail, a first slidable member configured to slide within said first side rail, a second slidable member configured to slide within said second side rail, a coupler secured to said first side rail and slidably and pivotably coupling said first side rail to said channel, and a hook coupled to said second side rail and configured to hook said second side rail to said mounting bar when said ladder is in a use configuration;
- wherein:
  - said ladder is selectively retractable in a lengthwise direction and selectively collapsible in a widthwise direction; and
  - in a stowed configuration, said ladder extends parallel to said mounting bar.

10. The ladder system of claim 9, wherein said first slidable member is configured to telescope and pivot with respect to said first side rail.

11. The ladder system of claim 9, further comprising a plurality of rungs, each of said plurality of rungs retractably coupled to both of said first slidable member and said second slidable member.

12. The ladder system of claim 11, further comprising a slit in each of said first side rail and said second side rail, each of said slits configured for the passage of said plurality of rungs therethrough.

13. The ladder system of claim 12, wherein each of said plurality of rungs comprises a first member and a second member hingedly coupled to said first member.

14. The ladder system of claim 9, wherein said coupler comprises a fastening surface, a ball and socket joint, and a follower.

15. The ladder system of claim 9, wherein said channel faces away from said front vertical member and said rear vertical member when said mounting bar is secured to said front vertical member and said rear vertical member.

16. The ladder system of claim 9, wherein each of said first slidable member and said second slidable member comprises a foot configured to grip a ground surface.

17. The ladder system of claim 9, further comprising a joint coupling said first side rail to said first slidable member, said joint allowing said first slidable member to swivel relative to said first side rail.

18. A ladder system for a vehicle, said vehicle having a roof rack system including a front roof rack and a rear roof rack, said front roof rack having a front vertical member and said rear roof rack having a rear vertical member, said ladder system comprising:
- a mounting bar having a channel extending along a length of said mounting bar;
- a pair of securing members securing said mounting bar to said front vertical member and said rear vertical member such that said mounting bar extends along a length of said vehicle; and
- a ladder comprising a first side rail, a second side rail, a first slidable member configured to slide within said first side rail, a second slidable member configured to slide within said second side rail, a coupler secured to said first side rail and pivotably coupling said first side rail to said channel, and a hook coupled to said second side rail and hooking said second side rail to said mounting bar when said ladder is in a use configuration.

19. The ladder system of claim 18, wherein said ladder is slidably coupled to said mounting bar.

20. The ladder system of claim 18, further comprising a cradle secured to said mounting bar, said cradle configured to retain said first side rail and said second side rail when said ladder in a stowed configuration.

* * * * *